United States Patent
Burlett et al.

(10) Patent No.: US 9,434,222 B2
(45) Date of Patent: Sep. 6, 2016

(54) RUBBER COMPOSITION AND DESIGN FOR SNAP-IN TIRE VALVE

(71) Applicant: The Gates Corporation, Denver, CO (US)

(72) Inventors: Donald James Burlett, Oxford, MI (US); John Graeme Knox, Oxford, MI (US)

(73) Assignee: GATES CORPORATION, Denver, CO (US)

( * ) Notice: Subject to any disclaimer, the term of this patent is extended or adjusted under 35 U.S.C. 154(b) by 581 days.

(21) Appl. No.: 13/796,119

(22) Filed: Mar. 12, 2013

(65) Prior Publication Data

US 2014/0261753 A1 Sep. 18, 2014

(51) Int. Cl.
| B60C 29/02 | (2006.01) |
| B29C 67/00 | (2006.01) |
| B29C 71/00 | (2006.01) |
| B60C 1/00  | (2006.01) |
| B60C 29/00 | (2006.01) |
| C08L 23/16 | (2006.01) |
| C08K 5/14  | (2006.01) |

(52) U.S. Cl.
CPC .............. *B60C 29/02* (2013.01); *B29C 67/00* (2013.01); *B29C 71/00* (2013.01); *B60C 1/00* (2013.01); *B60C 29/005* (2013.01); *C08K 5/14* (2013.01); *C08L 23/16* (2013.01); *Y10T 137/3724* (2015.04)

(58) Field of Classification Search
CPC ..... B60C 29/00; B60C 29/005; B60C 29/02; B60C 29/04; B60C 23/0496; B60C 23/0494; F16K 15/20; F16K 15/202
USPC ................................................. 152/427–429
See application file for complete search history.

(56) References Cited

U.S. PATENT DOCUMENTS

| 1,876,367 | A |   | 9/1932  | Wakefield |
| 2,255,932 | A |   | 9/1941  | Kraft et al. |
| 2,308,952 | A |   | 1/1943  | Ickes |
| 2,625,170 | A |   | 1/1953  | Mayer |
| 2,862,539 | A | * | 12/1958 | Williams ............ B60C 29/02  152/427 |
| 2,917,097 | A | * | 12/1959 | Lee .................... B60C 29/02  152/427 |
| 3,287,485 | A |   | 11/1966 | McCord |
| 3,670,688 | A |   | 6/1972  | Seaberg |
| 4,793,374 | A |   | 12/1988 | Earley |
| 5,300,569 | A |   | 4/1994  | Drake et al. |
| 5,776,294 | A |   | 7/1998  | Nagel |

(Continued)

OTHER PUBLICATIONS

R.O.Babbit, ed., "The Vanderbilt Rubber Handbook," R.T. Vanderbilt Company, Norwalk CT, (1978) at p. 163.

(Continued)

*Primary Examiner* — Jason Bellinger
(74) *Attorney, Agent, or Firm* — Paul N. Dunlap, Esq.; Jeffrey A. Thurnau, Esq.

(57) ABSTRACT

A snap-in tire valve for mounting in a valve hole in a wheel rim, having a valve body and a resilient member having an overall shape including a groove and a rib adapted to snap into and be retained in the hole. The resilient member may include a rubber that is the reaction product of ethylene-propylene copolymer elastomer, a peroxide curative, zinc diacrylate or zinc dimethacrylate, and a high-density inert filler, such as barium sulfate. The resilient member may include a first and second rubber members of different compositions from each other and defining two layers under the groove. The thickness of the layer of the first rubber member is preferably greater than the thickness of the layer of the second rubber member.

18 Claims, 4 Drawing Sheets

(56) References Cited

U.S. PATENT DOCUMENTS

| | | | |
|---|---|---|---|
| 6,005,480 A | 12/1999 | Banzhof et al. | |
| 7,281,421 B2 | 10/2007 | Yin et al. | |
| 8,312,904 B2 * | 11/2012 | Palaoro | B60C 29/00 137/223 |
| 8,511,332 B2 * | 8/2013 | Robert | B60C 23/0494 137/227 |
| 2005/0087229 A1 | 4/2005 | Uleski | |
| 2005/0178437 A1 | 8/2005 | Schultz | |
| 2005/0267245 A1 | 12/2005 | Sandusky et al. | |
| 2006/0272760 A1 | 12/2006 | Teratani et al. | |
| 2011/0056602 A1 | 3/2011 | Thomas et al. | |
| 2013/0333817 A1 * | 12/2013 | Burlett | B60C 29/005 152/427 |

OTHER PUBLICATIONS

European Patent Office, International Search Report, Mailing date Jul. 22, 2014.

* cited by examiner

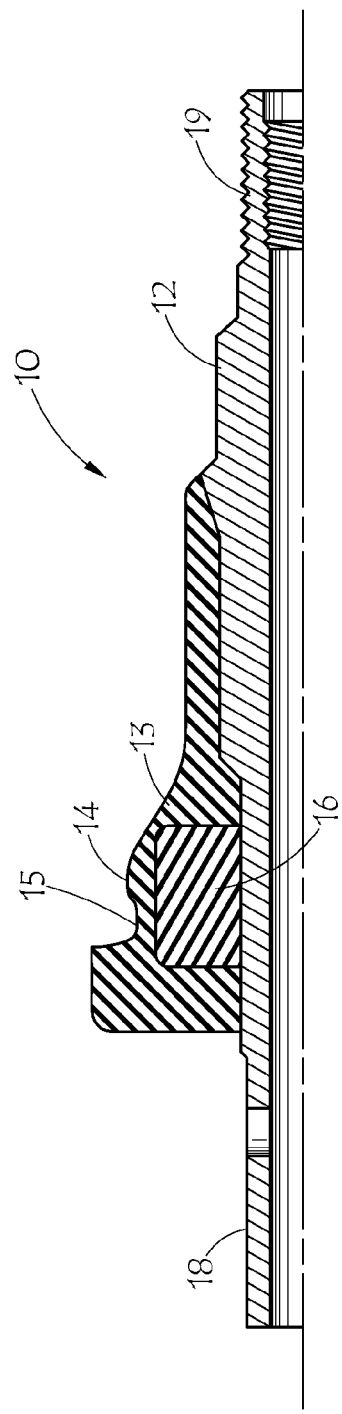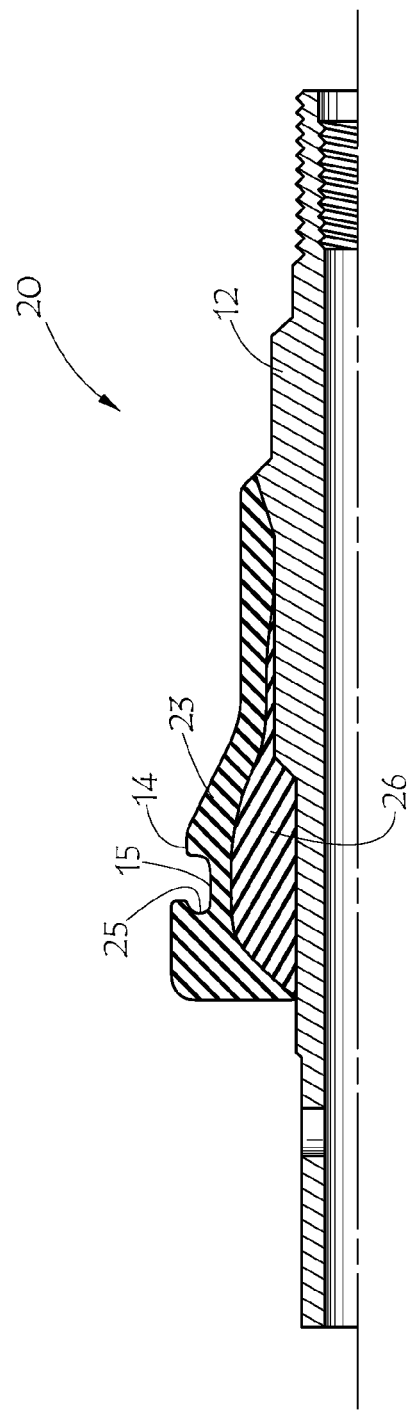

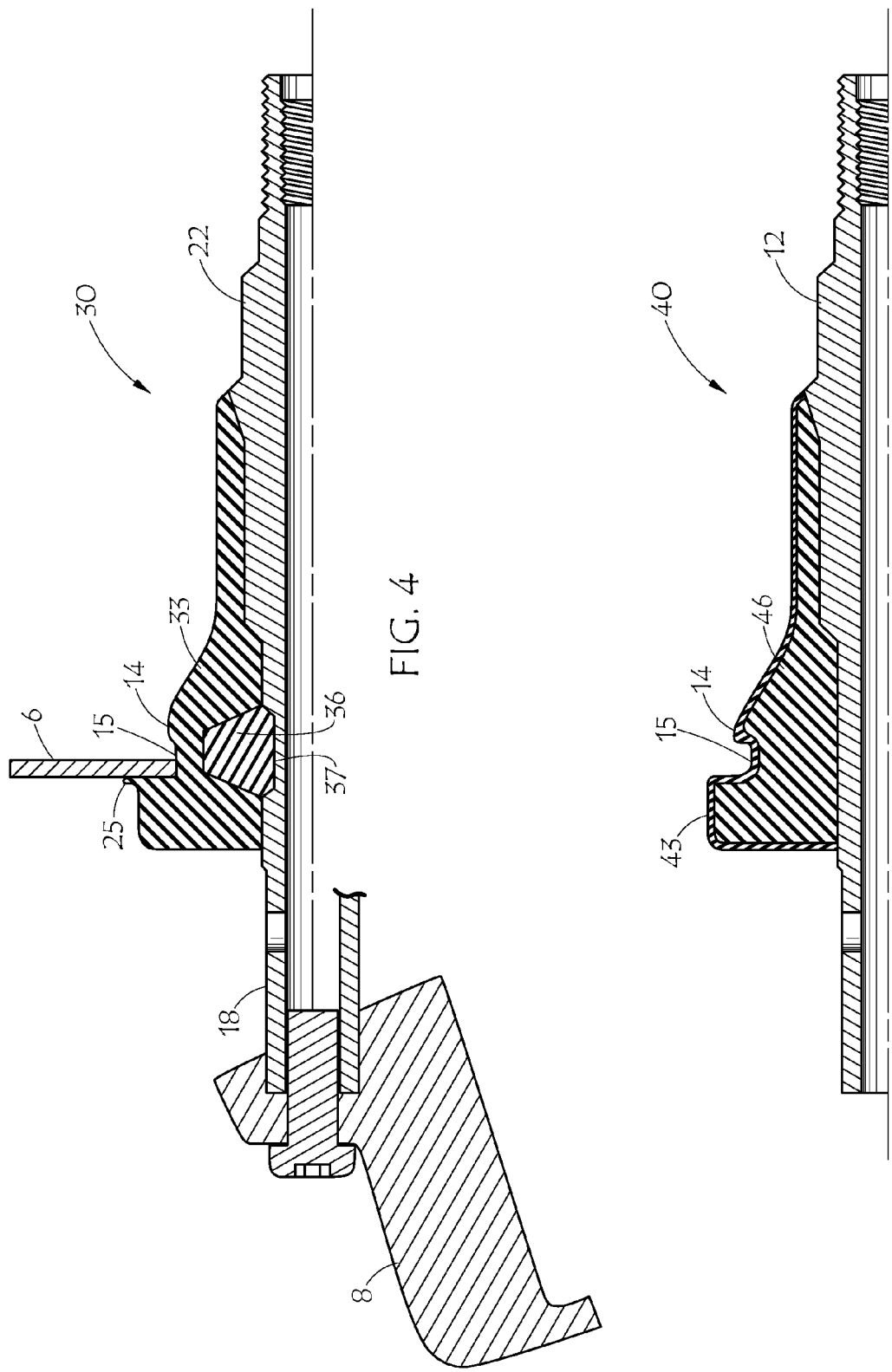

RUBBER COMPOSITION AND DESIGN FOR SNAP-IN TIRE VALVE

BACKGROUND OF THE INVENTION

1. Field of the Invention

This invention relates generally to rubber compositions and designs for improved snap-in tire valves, more particularly to snap-in valves having a metal-adhesive, heat-resistant EPM rubber composition, and specifically to a snap-in tire valve having two rubber layers, one with the metal adhesive composition and one with non-metal-adhesive rubber.

2. Description of the Prior Art

Tire valves of the snap-in type are known. A shaped resilient seal is commonly over molded around a brass valve body. The seal shape generally includes a circumferential ridge or rib that must be compressed or otherwise deformed to let the seal snap into the valve hole in the wheel rim and a groove that retains the valve in the valve hole. The resilient seal then supports the valve body and seals the hole. The support and sealing functions are expected to last the life of the tire. U.S. Pat. Nos. 3,287,485 and 3,670,688 disclose examples of valves of rubber and brass that snap into a wheel rim. The '485 patent discloses a suitable styrene-butadiene rubber (SBR) formulation and a suitable butyl rubber (BR) formulation for the rubber seal. The '688 patent discloses that adhesives may be used to bond the rubber to the valve body. Sulfur-cured ethylene propylene diene elastomer ("EPDM") and natural rubber have also been used for the rubber component.

Tire pressure monitoring system ("TPMS") applications generally include a pressure sensing module mounted on the valve body inside the wheel. U.S. Pat. Nos. 6,005,480 and 7,281,421 disclose tire pressure sensor assemblies including a tire valve that can snap into a wheel rim. The added mass of the sensor results in much higher demands placed on the rubber seal of the valve. These demands are further aggravated by high speeds of revolution, high accelerations, and by wheels that are reportedly running hotter than in the past which may be due to heat transferred to wheel rims from brake systems. Thus, applications of TPMS can experience accelerations of up to 1400 Gs and operating temperatures of up to 100° C. These demands have caused conventional snap-in tire valves to fail early due to cracks at various critical locations in the rubber seal, adhesion loss, and/or other problems due to thermal or heat aging of the rubber.

Snap-in tire valves are to be distinguished from other designs, such as bolt-on designs, rigid designs, and the like, which use entirely different sealing methods, such as o-rings, gaskets, permanent welds, or the like.

SUMMARY

The present invention is directed to systems and methods which provide snap-in tire valves with improved high speed and high temperature performance, especially suitable for use in tire pressure monitoring systems and applications.

The invention is directed to a snap-in tire valve for mounting in a valve hole in a wheel rim, having a valve body and a resilient member having an overall shape including a groove and a rib adapted to snap into and be retained in the hole. According to one embodiment of the invention, the resilient member includes a first rubber member surrounding and bonded to a first portion of said valve body and a second rubber member surrounding and bonded to at least a portion of the first rubber member. The first and second rubber members are of different compositions from each other and define two layers under the groove. The thickness of the layer of the first rubber member is preferably greater than the thickness of the layer of the second rubber member.

According to an embodiment of the invention, one of the rubber members is ethylene-propylene-based elastomer comprising zinc diacrylate or zinc dimethacrylate, and the other rubber member is free of zinc diacrylate and zinc dimethacrylate.

According to an embodiment of the invention, the second rubber member extends onto and is bonded to a second portion of said valve body. The second rubber member may completely surround the first rubber member.

The invention is also directed to a resilient member for a snap-in tire valve that is the reaction product of ethylene-propylene copolymer elastomer, a peroxide curative, zinc diacrylate or zinc dimethacrylate, and a high-density inert filler, such as barium sulfate. The zinc diacrylate or zinc dimethacrylate may be present in the range of 3 to 20 parts weight per hundred parts of elastomer. Barium sulfate may be present in the range of 10 to 30 parts weight per hundred parts of elastomer.

The invention is also directed to a method including the steps of applying a first rubber composition to a valve body and vulcanizing the first rubber composition, then over-molding a second rubber composition to surround and bond to at least a portion of the vulcanized first rubber composition, and vulcanizing the over-molded second rubber composition to produce a rubber seal shaped to snap into a valve hole in a wheel rim. The second rubber composition may substantially covers the first rubber composition. The first rubber composition may include an ethylene-alpha-olefin elastomer, a peroxide curative, zinc diacrylate or zinc dimethacrylate, and a high-density inert filler. The second rubber composition may be free of zinc diacrylate and zinc dimethacrylate.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings:

FIG. 2 is a half sectional view of a tire valve according to an embodiment of the invention;

FIG. 3 is a half sectional view of a tire valve according to another embodiment of the invention;

FIG. 4 is a half sectional view of a TPMS tire valve according to another embodiment of the invention;

FIG. 5 is a half sectional view of a tire valve according to another embodiment of the invention.

DETAILED DESCRIPTION

Figure 1:
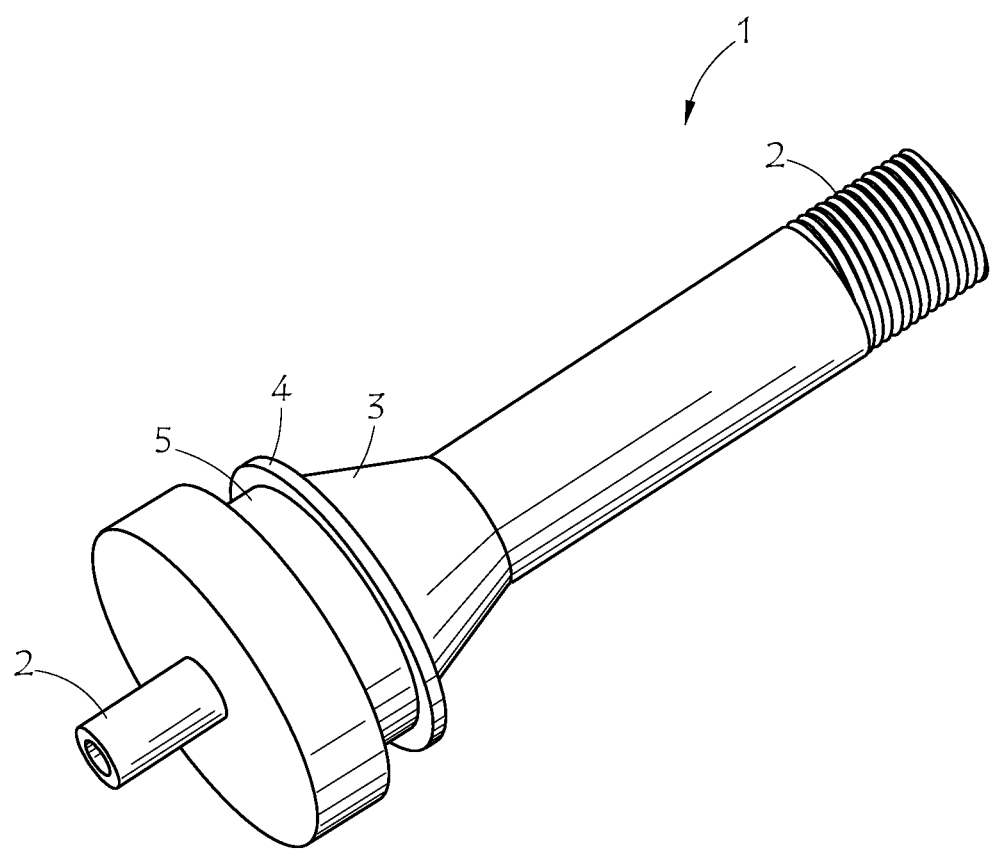
FIG. 1 is a perspective view of a tire valve of the prior art.

FIG. 1 shows a conventional snap-in tire valve of the prior art. Tire valve 1 includes brass valve body 2 arranged along the axis thereof and resilient member 3 over-molded around the outside surface of the brass valve body. The resilient member is shaped so that it can be inserted into a valve opening or hole in a wheel rim (not shown). Rib 4 is larger than the valve hole diameter, so that the rib must deflect as the tire valve is pulled though the hole. Groove 5 has an outside diameter somewhat bigger than the hole so that when the edge of the hole snaps into the groove, the resilient member residing between the edge of the hole and the brass valve body, i.e., the resilient member in the vicinity of the groove, remains in compression to effect an air-tight seal between the valve body and the wheel rim. In other words, groove 5 provides the sealing surface of the tire valve. The resilient member typically consists of a sulfur-cured, rubber composition.

As mentioned in the background section, modern performance demands include higher g-forces and higher temperatures resulting in higher stresses on the resilient member. The mounting of a pressure sensor module or sending unit onto the valve body inside the wheel shifts the center of mass and causes the valve to want to pivot in the valve hole during wheel rotation. This pivoting motion can directly cause air to leak between the rubber and the wheel, or it can cause cracking in the rubber and accelerate crack propagation, which also leads to air leaks. High temperatures can reduce the strength of the rubber, resulting in increased cracking and/or crack propagation. High temperatures also cause compression set and/or heat aging that can, over time, degrade or destroy the resilience required for air-tight valve to rim sealing.

A first embodiment of the invention solves the problems of the prior art by utilizing a new rubber composition for the resilient element 3. According to this first embodiment of the invention, the rubber composition includes a heat-resistant elastomer, with a peroxide cure system, a metal-adhesive coagent, and a high-density filler. The rubber composition exhibits excellent adhesion to brass and other metals as a result of the metal-adhesive coagent. Although the valve body can be coated with adhesive to facilitate bonding of the rubber, with this composition, adhesive coating is not necessary on brass valve bodies. Preferably, the rubber composition exhibits somewhat higher modulus values than prior art compositions. Modulus may be determined using common tensile modulus measurements, for example in accordance with ASTM D-412, and modulus may be indicated by tensile stress at given elongation as defined in ASTM D-1566 and D-412. Herein, modulus measurements are equated with tensile stress at given elongation and indicated by the letter "S" followed by the given elongation. Thus, "S100" means the tensile stress at 100% elongation and may be referred to as the "100% modulus." The modulus may advantageously be in a predetermined range, which may be dependent on the particulars of the wheel and valve hole dimensions and orientation, the desired maximum g-force, the tire pressure, and the like, for example from 270-380, 270-800, or 400-550. If the modulus is too low, the g-forces will result in air leaks during use. If the modulus is too high, the valve will be too hard to install in the valve hole, resulting in tearing and the like. An alternate modulus indication is rubber hardness measured with a durometer, preferably on the Shore A scale, for example in the range from 53-75, or 53-63, or 58-62.

The heat resistant elastomer may be one of those having a saturated backbone such as those listed in ASTM D-1418 section 3.1, including ethylene-propylene diene elastomer (EPDM), ethylene-propylene copolymer elastomer (EPM), ethylene-ethylacrylate (AEM) or copolymers of ethylene and other acrylates, acrylic elastomers (ACM), and the like. Alternately, the heat resistant elastomer may be a highly saturated elastomer (due to hydrogenation or the like) such as hydrogenated nitrile (HNBR), hydrogenated SBR (HSBR) or the like. Preferably the heat resistant elastomer is an ethylene-alpha-olefin elastomer, such as an ethylene-propylene-based elastomer (i.e., EPM or EPDM). By ethylene-propylene-based elastomer is meant that the primary or majority or only elastomer constituent of the composition is EPM or EPDM. This excludes the use of minor amounts of EPDM or EPM as an additive to elastomers such as SBR.

The peroxide cure system may include any of the known peroxide curatives for rubber, at a suitable level for achieving a satisfactory cure state. The cure system may include one or more other coagents (besides the metal-adhesive coagent discussed below), accelerators, or sulfur. The accelerators may be one or more selected from reactive rubber chemicals, many examples of which contain sulfur.

The metal-adhesive coagent is preferably a brass-adhesive coagent. A coagent is an additive to the rubber composition that modifies or enhances the physical properties and/or increases the crosslink efficiency of the cure reaction. The metal-adhesive coagent also provides direct adhesion of the rubber to brass valve body surfaces. Preferred coagents include zinc diacrylate (ZDA) and zinc dimethacrylate (ZDMA), such as that sold under the tradename Saret by Sartomer Company. The metal adhesive coagent is used in amounts suitable for promoting direct adhesion to the valve body. For example, ZDA, ZDMA, or other coagents may be used at levels of about 3 PHR or more, up to about 20 PHR, preferably about 5 PHR to about 10 PHR.

The high-density filler is preferably an inert filler such as barium sulfate (also known as barytes) or titanium dioxide or a combination of such fillers. Inert herein means a filler with no significant reinforcing effect and also no significant participation in cure reactions or effect on the cure system. Other more reactive high density fillers may be useful, such as ZnO, ZnS, PbO, MgO, Sb2O3, and the like, but they present the risk of affecting cure rates or physical properties. Other common reinforcing or semi-reinforcing fillers such as carbon black, silica or clays may not be as effective because they are not high enough in density and/or because they exhibit reinforcing effects that degrade processability and/or make final properties unacceptable. It is believed that the inert high-density filler is particularly helpful to reduce the permeability to air of the resilient rubber element without causing excess modulus or viscosity. The density of the filler may be greater than about 3 g/cc, or preferably about 4 g/cc or greater. The high-density inert filler is preferably present at a concentration of at least about 10 parts per hundred parts of elastomer ("PHR"), preferably at least 15

PHR, or about 20 PHR. The resulting density of the rubber composition or compound should preferably be 1.1 or greater, preferably 1.10-1.20, i.e., to exhibit an increase in density without overly increasing modulus.

The first embodiment has been found to provide greatly improved tire valve performance at high spin forces and high temperatures, particularly when compounded to a predetermined modulus. However, it has proven difficult to manufacture because of a tendency for the rubber composition to stick not only to the brass valve body but also to any metal in the injection mold. While the sticking can be prevented in a compression mold with various mold releases or mold coatings available on the market, the durability (reflected in the frequency of application required) is currently not sufficient for long injection molding runs for large numbers of parts with this rubber composition. Mold coatings based on fluoropolymers such as fluorinated polyethylenes, for example polytetrafluoroethylene (PTFE), are preferred for all types of molding operations.

According to a second embodiment of the invention, the tire valve includes two rubber layers. The first rubber layer has a composition like that of the first embodiment and is applied directly to the valve. Thus, the first rubber layer may bond directly to a brass valve body as in the first embodiment. The second rubber layer may then surround or cover at at least a portion of the first rubber layer, providing the final net shape and size required of the rubber member. The first rubber layer preferably occupies the majority of the gap between the valve body and the wheel rim. In other words, there are two rubber layers under the sealing surface of the groove, i.e., between the sealing surface and the valve body. Thus, since the first layer is thicker, the first layer provides the improved heat resistance and resistance to the g-forces and improved sealing. According to this embodiment, the second rubber may preferably completely surround, i.e., cover the entire extent of, the first rubber layer, coming between the metal-adhesive first rubber layer and the outer mold cavity during a molding process, thus permitting easy molding without adverse adhesion of the first compound to the metal of the mold.

The second rubber layer may also come into contact with the valve body. Thus, it may be advantageous for the second rubber layer to be of the type that readily adheres to brass or other valve body material, but not to the mold material, which may be steel for example. For example, the second rubber layer may be a composition such as conventionally used. Because the first layer occupies the majority of the gap between the valve body and the wheel, the problems of leakage and heat aging may be largely resolved even with the presence of some second layer of lesser heat resistance and/or lesser physical properties. Thus, the second rubber layer may be a conventional rubber composition based on sulfur-cured SBR, BR, NR, EPDM, or the like, or blends thereof, as listed in ASTM D-1418 section 3.3. Alternately the second rubber layer may be a more heat resistant composition, for example, based on peroxide cure, and/or more heat resistant elastomers such as EPDM, EPM, acrylic elastomers (ACM), AEM, HNBR, or the like. Adhesion between the two rubber layers is important, so a compatible cure system is preferred to provide adhesion of the second layer to a first layer that has already been cured.

The second rubber layer of this second embodiment is different from the first at least in that it does not include the metal adhesive coagent. Preferably, therefore, the second rubber layer does not include any ZDA or ZDMA, i.e., it is free of ZDA and ZDMA. Thus, the second rubber may be a heat-resistant composition similar to the first rubber layer, but without ZDA or ZDMA. Since the second rubber layer is relatively thin in the critical region of the groove and sealing surface, it can be a less-heat-resistant rubber than the first layer, such as conventional sulfur-cured rubber composition, for example, based on one or more elastomers such as NBR, SBR, BR, EPDM, NR, or the like, as listed in ASTM D-1418 section 3.3. More preferably, one or both rubber layers include peroxide or other compatible curatives capable of forming crosslinks between the two layers for good adhesion.

The overall shape of the two-layer rubber member is molded as desired, namely to provide the desired snap-in effect and to provide air-tight valve to rim sealing between the valve body and the wheel rim. The underlying shape of the first rubber layer, and therefore the shape of the second rubber layer, may take a wide variety of forms, examples of which are illustrated in FIGS. 2-6.

The embodiment shown in FIG. 2 shows a tire valve 10 with a first rubber layer 16 in a simple annular shape bonded to valve body 12 in the vicinity of groove 15 and rib 14. Second layer 13 over molds layer 16 and provides the desired final shape of tire valve 10. Thus, there are two rubber layers under the sealing surface in groove 15. Note that second layer 13 also is bonded extensively to portions of valve body 12 not in contact with first rubber layer 16. Thus, the relative amount of the two rubber layers makes the first rubber layer the minor component overall. However, in the vicinity of the groove, the first rubber layer is still the major component in terms of thickness in that area. Thus, the first rubber layer supplies the greatest portion of the physical properties necessary to meet the performance demands in the region of highest stress between the hole and the valve body. The external end 19 of valve body 12 is threaded externally for a cap or threaded hose fitting (not shown), and threaded internally for a conventional valve core or other components (not shown, but well-known). The internal end 18 of valve body 12 may be adapted as desired, for example, for attaching a housing for TPMS components located inside the wheel. Note that "internal" and 'external" may be used herein to refer to the location of a portion of a valve with respect to the wheel it is to be mounted on, internal being the side the tire is mounted on and thus internal with respect to the tire; external being the other side.

The embodiment of FIG. 2 may be manufactured in two steps, i.e., two rubber molding steps. First layer 16 may be extruded as a tube or sleeve, cut to size and installed over valve body 12. Layer 16 may then be compression molded, or partially cured in a compression mold, in order to fix the shape and prevent distortion from subsequent handling. Then second layer 13 may be over molded by injection molding, transfer molding, or compression molding. The problem of sticking to the mold during the first compression molding step has been found to be resolvable with conventional mold release or permanent or semi-permanent mold coating technology. The problem of mold release durability is resolved by using compression molding instead of injection molding. Any defects in the first rubber layer from molding difficulties can also be covered up by the second rubber layer.

The embodiment shown in FIG. 3 shows that first rubber layer 26 has been applied and bonded to valve body 12 in a shape closer to the overall final shape of the rubber member. Still, in the vicinity of groove 15 and rib 14, first layer 26 occupies the majority of the thickness of the rubber. Second layer 23 over molds layer 26 and provides the desired final shape of tire valve 20. Note that second layer 23 also is bonded to portions of valve body 12 not in contact with first rubber layer 26, but not as extensively as in the embodiment of FIG. 2. According to this embodiment of the invention, the inside portion of groove 15 includes a flange or lip 25 which can be adapted to spread outward against the inside surface of a wheel rim upon installation. This and/or other useful features may advantageously be incorporated into various embodiments of the present invention. Such features are further described in the international patent application publication WO 2010/149933 A1, the entire contents of which are hereby incorporated herein by reference.

The embodiment of FIG. 3 may be manufactured in a similar way as that of FIG. 2, as described above. The exact shape of the first rubber layer may be controlled by the shape of the compression mold cavity in the first molding step.

The embodiment shown in FIG. 4 shows first rubber layer 36 has been applied or bonded to valve body 22 in a trapezoidal shape that is seated in recess 37 in valve body 22 for extra holding power. Again, in the vicinity of groove 15 and rib 14, first layer 36 occupies the majority of the thickness of the rubber. Second layer 33 over molds layer 36 and provides the desired final shape of tire valve 30. Note that second layer 33 also is bonded to portions of valve body 22 not in contact with first rubber layer 36, as in the embodiment of FIG. 2. As in the embodiment of FIG. 3, the inside portion of groove 15 includes a flange or lip 25 which is shown spread outward against the inside surface of wheel rim 6 upon installation. FIG. 4 also illustrates TPMS housing 8 mounted on internal end 18 of valve body 22 in the interior of wheel rim 6. As mentioned above, this and/or other useful features may advantageously be incorporated into various embodiments of the present invention, and such features are further described in the international patent application publication WO 2010/149933 A1, the entire contents of which are hereby incorporated herein by reference.

The embodiment of FIG. 4 may be manufactured in a similar way as that of FIG. 2, as described above. The first rubber layer may even be applied initially in the same annular shape as in FIG. 2, and subsequently the trapezoidal shape of FIG. 4 controlled by the shape of the compression mold cavity in the first molding step.

The embodiment shown in FIG. 5 shows first rubber layer 46 applied and bonded to valve body 12 in a shape approximately the overall final shape of the entire rubber member of tire valve 40, not only in the region of groove 15 and/or rib 14. Thus, first layer 46 occupies the majority of the thickness of the rubber in the entire rubber part. Second layer 43 over molds layer 46 and provides a thin layer, primarily for the purpose of preventing the metal-adhesive first layer from sticking to the mold. Note that second layer 43 makes only minimal or no contact with valve body 12. Thus, the second layer may advantageously be bondable to the first rubber layer during vulcanization, but need not have any special ability to bond to brass.

The embodiment of FIG. 5 may be manufactured in a similar way as that of FIG. 3, as described above. Alternately, this embodiment may be molded in a single step. The first rubber layer may be applied to the valve body in unvulcanized form, for example as an annular extrusion, or the like. The second rubber layer may then be applied in a thin layer over the first. Then, both layers together may be placed in a shape-forming mold and the rubber member as shown in FIG. 5 formed in a single molding operation. The exact shape of the rubber may be controlled by the shape of the compression mold cavity in the molding step. The thickness of the second layer need not be as uniform as shown in FIG. 5. The main purpose of the second layer is to prevent the first layer from contacting and sticking to the mold cavity. The first layer provides the performance properties desired in the final product. The thickness of the second layer of rubber under groove 15, may advantageously be less than about 10% of the total rubber thickness under the groove.

In various embodiments of the invention, the degree of compression exerted on the rubber member by the hole may be from 10% to 40%, preferably from about 20% to about 30%. At least about 20% compression after installation may be advantageous in order to maintain no air leaks around the tire valve at low temperatures, e.g., around −40° C.

According to a third embodiment of the invention, the tire valve includes two rubber layers, but preferably the second, or outer, layer is located only in the vicinity of the groove. The first rubber layer is applied directly to the valve and may provide near net shape. Thus, the first rubber layer may bond directly to a brass valve body as in the first embodiment. The second rubber layer may then be applied to and bond to the first rubber layer, providing the final net shape and size required of the rubber member in the vicinity of the groove. As in other embodiments, the first rubber layer may occupy the majority of the gap between the valve body and the wheel rim, but any desired distribution of the thickness of the two rubber layers in the gap may be used. In other words, there are two rubber layers under the sealing surface of the groove, i.e., between the sealing surface and the valve body. The two rubber layers may provide different individual desired properties and functions, providing great design flexibility. For example, the first layer may provide improved heat resistance and resistance to the g-forces and improved compression set or the like. The second layer may provide cut resistance, abrasion resistance, ozone resistance or the like in the vicinity of the wheel rim. The first layer may provide the primary sealing and supporting structure between valve stem and wheel rim, while the second layer may provide for easy installation of the valve into a valve hole wherein the rib must deform enough to let the rim snap into the groove, as well as the actual sealing surface. The second layer may be a relatively soft rubber compound, or a gel, or other suitable sealing material.

Figure 6:
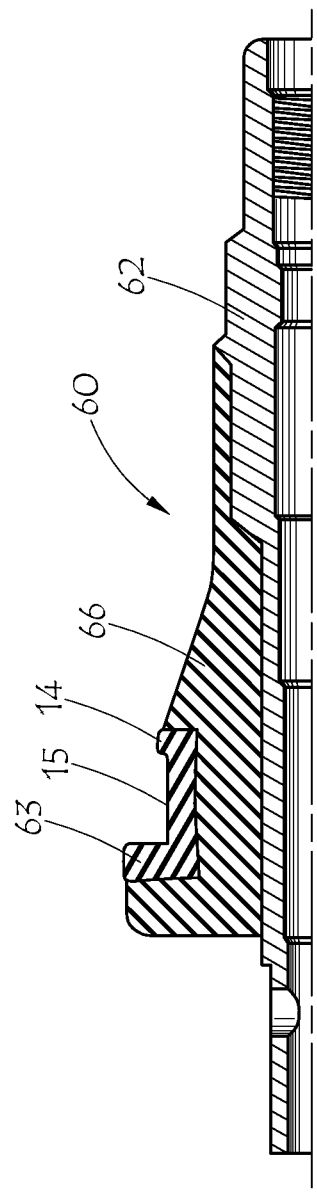
FIG. 6 is a half sectional view of a tire valve according to another embodiment of the invention.

FIG. 6 provides an illustration of a tire valve according a third embodiment. FIG. 6 shows first rubber layer 66 applied and bonded to valve body 62 in a shape approximately the overall final shape of the entire rubber member of tire valve 60, but not the final shape in the region of groove 15 and/or rib 14. Thus, first layer 66 may be the majority of the rubber in the entire rubber part. Second layer 63 overmolds layer 66 in the vicinity of groove 15 and rib 14 and thus forms the overall final shape of the rubber member in that region. Note that second layer 63 makes no contact with valve body 62. Thus, the second layer may advantageously be bondable to the first rubber layer during vulcanization, but need not have any special ability to bond to brass. The two rubber layers of the rubber member described herein could also be considered to be two rubber members molded and bonded together to make a single, final resilient member, i.e., a dual-rubber design for the elastomeric body portion of the snap-in valve.

As in the other embodiments of the invention, the tire valve may possess axisymmetry or be of generally cylindrical, symmetric shape, or the tire valve may have asymmetric features. WO 2010/149933 A1 describes some asymmetric features which may be advantageously applied to embodiments of the invention, including, for example, a reduction in size of the rib in certain portions of the circumference, an undercut within the rubber on the lower side of the valve body, the aforementioned lip may spread outward around a portion of the circumference of the hole, and the like.

The following illustrations, inventive Examples ("Ex.") and Comparative Examples ("Comp. Ex.") further illustrate embodiments of the invention and the advantages thereof over conventional materials. The rubber compositions to be discussed below were applied to brass valve bodies using conventional injection molding or compression molding techniques according to the first embodiment described above. The stems included TPMS enclosures such as housing 8 illustrated in FIG. 4. The resulting tire valves were subjected to spin testing according to one or more of four different spin test protocols. The four protocols will be discussed in order from least severe to most severe. For each of the protocols, the same hardware was used, but different test conditions. The tire valves were mounted in valve holes in a wheel rim having multiple holes, using a standard tire soap lubricant to facilitate pulling the valve into the hole. The tire valves were individually pressurized to 2.5±0.1 bar. Two types of wheel rims were used: (1) a "thick rim" having 4-mm thickness and having "small holes" of 11.3-mm diameter with a 0.2-mm chamfer; and (2) a "thin rim" having 1.8-mm thickness and having "large holes" of 11.7-mm diameter with a 0.2-mm chamfer. Installation force was measured only on thick rims, pulling at 150 mm/min under lubricated conditions.

Adhesion was tested in accordance with the lap shear method of ASTM D816 at room temperature with a pull rate of 2.0 inches (50 mm) per minute with brass metal plates with a test area of about one square inch.

The first test protocol is called the Low Speed Endurance Test. The pressurized valves are subjected to a cycle consisting of quickly accelerating the wheel speed from zero to a g-force of 821 G in about six seconds. Herein, "g-force" is the ratio of the centrifugal acceleration at a given rotational speed to the acceleration of gravity, and therefore "G" is dimensionless, simply indicating g-force. This wheel speed corresponds to about 2000 rpm and may be typical of a full size auto (depending on tire size, of course) traveling about 270 km/h. After holding at 821 G for five minutes, the wheel is quickly stopped with a brake and held at rest for one minute. This approximately six-minute cycle is repeated until all the valves in the wheel have leaked, which is indicated by a loss of pressure in the valve. This test is carried out at 25° C., i.e., room temperature. After the test, the tire valve is inspected to determine the cause of the leak, which may be due to cracks in the rubber, dislocation of the rubber from proper seating in the hole, rotation or other movement of the valve and housing, loss of adhesion between rubber and brass, metal valve body, and the like. Typically four valves are tested so the results can be averaged.

The second test protocol is called herein the Medium Speed Endurance Test, although at one time it was considered a high-speed test. The pressurized valves are subjected to a cycle consisting of quickly accelerating the wheel speed from zero to 1113 G. After holding at 1113 G for five minutes, the wheel is quickly stopped with a brake and held at rest for one minute. This approximately six-minute cycle is repeated until all the valves in the wheel have leaked. This test is carried out at 25° C., i.e., room temperature. The same inspection as for the first test protocol is then carried out. Typically four valves are tested so the results can be averaged.

The third test protocol is called the Hot High-Speed Test. The pressurized valves are subjected to a temperature of 85° C. during this test. The valves are subjected to four-hours at a constant speed corresponding to 260 km/h. The valves are then subjected to thirty cycles consisting of quickly accelerating the wheel speed from zero to 500 G and holding for two minutes, then accelerating quickly to 1400 G and holding for thirty minutes, then braking to a stop and holding for twenty seconds. Each of the thirty cycles thus takes about 33 minutes, so the total test time is about 20.5 hours. The time at which leakage occurs is noted if a valve does not pass the test without leakage. The same inspection as for the first test protocol is then carried out. Typically four valves are tested so the results can be averaged.

The fourth test protocol is called the High-Temperature High-Speed Endurance Test. This test begins with ten preheat cycles, each consisting of heating the pressurized valves to 120° C. for twenty minutes and then cooling them back to room temperature. Then the valves are subjected to spinning cycles at various temperatures as follows. One spinning cycle consists of quickly accelerating the wheel speed from zero to 1400 G and holding at 1400 G for one hour, then braking to 700 G and holding for thirty minutes, then stopping the wheel and holding for 30 minutes. This spinning cycle thus takes about two hours to complete. The spinning cycle is repeated five times at 40° C., ten times at 65° C., two times at 85° C., ten times at 65° C., five times at 40° C., ten times at 65° C., two times at 85° C., ten times at 65° C., and finally five times at 40° C. The temperature adjustments are carried out during the 0-G holding period of the spinning cycle. The total test time is about 120 hours. The time at which leakage occurs is noted if a valve does not pass the test without leakage. The same inspection as for the first protocol is then carried out. Typically three valves are tested so the results can be averaged.

It should be noted that the various test protocols correspond to the increasing demands placed on tire valves in the automotive markets of the world over recent years. The low-speed test represents the typical basic transportation vehicle with top speed of about 60 mph or so. The medium speed test represents faster vehicles on typical highways. The high-speed tests represent high-performance vehicles on the high-speed highways of Germany for example. The increased temperatures of the hot tests also take into account the increased wheel temperatures due to braking from high speeds and other factors leading to high temperatures.

Comparative Example 1

Comparative Example 1 represents the tire valve having a conventional rubber composition, i.e. the experimental "control" sample. The composition of Comp. Ex. 1 is a blend of SBR, EPDM, and BR as the elastomer component, filled with carbon black and/or silica for reinforcement and cost reduction, with oil added for adjusting the hardness and further cost reduction, and with typical amounts of other well-known ingredients such anti-oxidants, anti-ozonants, process aids, other fillers, sulfur and cure accelerators. Typical properties for such blends may be found in ASTM D-2000 Table 6 for "BA" rated rubber materials. The rubber used for Comp. Ex. 1 exhibited maximum use temperature somewhere in the range of about 70-100° C., Shore A rubber hardness of about 58, tensile strength of 2170 psi (15 MPa), elongation at break of 516%, S100 of 279 psi (1.9 MPa), and calculated density of about 1.15 g/cc. Tire valves with this rubber are capable of passing the Low Speed Endurance Test and Medium Speed Endurance Test, but are incapable of passing the heated, high-speed tests. Typical test results are shown in Table 1 for Comp. Ex. 1. Note that since Comp. Ex. 1 could not handle the Hot High-Speed Test, it was not run on the High-Temperature High-Speed Endurance Test.

Experiments according to embodiments of the invention are divided into three examples based on the range of hardness or modulus of the resilient member: soft, medium and high hardness. It should be understood that the necessary hardness may be dependent on the design of the snap-in tire valve and the shape of the rubber element, as well as the dimensions of the wheel rim, the size and weight and characteristics of the TPMS enclosure if any, and the demands of the application. These hardness designations are therefore somewhat relative to this testing situation, although the results are believed applicable to real vehicle applications. Also, rubber hardness measured on a piece of slab rubber according to ASTM D2240, will generally indicate about 5 points less than when tested in the product as formed on a brass tire valve body. In this case, even the soft example had higher modulus than the Comparative Example, as will be detailed later. Each example represents a series of similar compounds. To summarize the examples for now, for the current valve design and test conditions, it was found that the soft examples (Ex. 2) performed up to the level of the Comparative Example on the Low Speed Endurance Test and the Medium Speed Endurance Test, and exhibited much improved heat resistance. The soft Ex. 2 and medium Ex. 3 also far exceeded the Comp. Ex. 1 results on the hot, high-speed tests, passing all tests. The hard example (Ex. 4) performed very well in terms of cycles on spin tests, but proved too hard to install (snap-in) into the valve holes of the test rim without damage to the rubber, so it was not tested on all the tests. The hard compositions should be very useful in two-layer designs according the second or third embodiments of the invention described above, in particular by making the groove and rib regions of the resilient element of a somewhat softer rubber composition to reduce installation forces.

Example 2

A series of tire valves having relatively soft rubber compositions according to the first embodiment described herein were prepared and designated Ex. 2 in Table 1. The compositions were based on EPM elastomer (Vistalon 706, available under that trademark from ExxonMobile Chemical). Carbon black ranged from 40 to 56 PHR. Paraffinic oil ranged from 37 to 46 PHR. One of ZDMA and ZDA were added at 5 to 10 PHR as the metal adhesive coagent. The high-density inert filler was 20 PHR of barium sulfate. The composition also included 1 PHR of antioxidant and 0.3 PHR of scorch retarder, and the cure system was 9 to 11 PHR of peroxide (generally 40% active on clay). The rubber physical properties for this series exhibited about 150-175° C. maximum use temperature, Shore A rubber hardness in the range of 53 to 58, tensile strength in the range of 1500-2800 psi (10-19.3 MPa), elongation at break in the range of 460-650%, S100 in the range of 270-380 psi (1.9-2.6 MPa), and calculated density of about 1.10-1.11 g/cc. Thus, rubber hardness indicates a composition a little softer to equal to the conventional compound of Comp. Ex. 1, while the S100 modulus range is equal to or somewhat higher than the conventional compound. Tire valves with this rubber are capable of passing the Low Speed Endurance Test and Medium Speed Endurance Test, and they have excellent high-temperature heat resistance, but are incapable of passing the high-speed tests due to leaking from loss of sealing at high g-forces. Typical test results are shown in Table 1 for Ex. 2. Note that since Comp. Ex. 1 could not handle the Hot High-Speed Test, it was not run on the High-Temperature High-Speed Endurance Test.

Example 3

A second series of inventive tire valves having rubber of medium hardness compositions according to the first embodiment described herein were prepared and the results designated Ex. 3 in Table 1. The compositions were based on EPM elastomer (Vistalon 706, available under that trademark from Exxon-Mobile). Carbon black ranged from 40 to 60 PHR. Paraffinic oil ranged from 23 to 31 PHR. One of ZDMA and ZDA were added at 5 to 10 PHR as the metal adhesive coagent. The high-density inert filler was 20 PHR of barium sulfate. The composition also included 1 PHR of antioxidant and 0.3 PHR of scorch retarder, and the cure system was 8 to 9 PHR of peroxide (generally 40% active on clay). The rubber physical properties for this series exhibited about 150-175° C. maximum use temperature, Shore A rubber hardness in the range of 59 to 62, tensile strength in the range of 2100-2400 psi (14.5-16.5 MPa), elongation at break in the range of 350-400%, S100 in the range of 438-500 psi (3.0-3.4 MPa), and calculated density of about 1.11-1.13 g/cc. Thus, rubber hardness indicates a composition somewhat harder than the conventional compound of Comp. Ex. 1, and the S100 modulus range is also somewhat higher than the conventional compound and the soft compounds of Ex. 2. Typical test results are shown in Table 1 for Ex. 3. Tire valves with this rubber are capable of passing the Low Speed Endurance Test and Medium Speed Endurance Test, and they have excellent high-temperature heat resistance. In addition, they are capable of passing the High-Temperature High-Speed Endurance Test without leaking, although 1 of the three valves tested did leak at about 56 hours into the test. Note that the results on the Medium Speed Endurance Test far exceeded any other example tested. This series thus represents a preferred embodiment of the first embodiment of the invention having an S100 in the range of from about 380 psi to about 550 psi, or from 400 to 550 psi, or from 430 to 510 psi.

Example 4

A third series of a relatively hard rubber composition according to the first embodiment described herein was prepared. The composition was based on EPM elastomer (Vistalon 706, available under that trademark from Exxon-Mobile). The level of carbon black was 60 PHR, paraffinic oil was 20 PHR, and ZDA was added at 10 PHR as the metal adhesive coagent. The high-density inert filler was 20 PHR of barium sulfate. The composition also included 1 PHR of antioxidant and 0.3 PHR of scorch retarder, and the cure system was 5 PHR of peroxide (generally 40% active on clay). The rubber physical properties for this series (Ex. 4) exhibited about 150-175° C. maximum use temperature, Shore A rubber hardness of about 74, tensile strength of about 2500 psi (17 MPa), elongation at break of about 290%, S100 of about 770 psi (5.3 MPa), and calculated density of about 1.15 g/cc. Thus, rubber hardness and S100 modulus indicates a composition significantly harder than the conventional compound of Comp. Ex. 1 or the compounds of Ex. 2 and Ex. 3. Tire valves with this rubber are capable of passing the Low Speed Endurance Test and Medium Speed Endurance Test, and they have excellent high-temperature heat resistance. In addition, it is believed they are capable of passing the High-Temperature High-Speed Endurance Test without leaking, if used in a tire valve design according to the second or third embodiment of the invention adapted to permit installation without damage to the rubber. Note that the results on the Low Speed Endurance Test far exceeded any other example tested. This series thus represents a preferred embodiment of the first embodiment of the invention for some applications.

These results indicate that modulus or rubber hardness is an important variable in determining tire valve spin performance, but that different levels of modulus may be optimum for different maximum rotational rates. As indicated in Table 1, a higher modulus range may be best for lower speed applications, but a softer modulus for higher speed applications, with intermediate modulus best at intermediate speeds. Another interesting discovery involved the method of forming the rubber member onto the stem. For the High-Temperature High-Speed Endurance Test of Ex. 2 and Ex. 3, the results shown are for injection molded tire valves. For these materials and tests, it was found that compression molded tire valves did not perform as well, so injection molding is preferred for extreme performance. However, for the other less severe tests wherein both modes of rubber molding were also compared, it is believed that no significant difference or trend was observed.

sealing, heat resistance and physical properties, such as pressure relief valves, fill valves for other gases or liquids, and the like.

Although the present invention and its advantages have been described in detail, it should be understood that various changes, substitutions, and alterations can be made herein without departing from the scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may

TABLE 1

|  | Comp. Ex. 1 | Ex. 2 | Ex. 3 | Ex. 4 |
|---|---|---|---|---|
| Rubber type | Conventional, Sulfur-cured, SBR | Soft, Peroxide-cured EPM | Medium, hardness, Peroxide-cured EPM | Hard, Peroxide-cured EPM |
| Adhesion to brass (lap shear, peak load in N)[1] | 1117-3741 | 1664-4555 | 1196-5073 | Not tested |
| S100 (psi) | 279 | 270-379 | 438-500 | 770 |
| Hardness (Shore A, on slab) | 58 | 53-58 | 59-61 | 74 |
| Hardness (Shore A, on valve) | 63 | 58-64 | 63-68 | Not tested |
| Installation Force (N) | 598-743 | 300-431 | 868-1090 | Too high |
| Installation damage | None | None | Occasional | Rubber Tear |
| Low Speed Endurance Test |  |  |  |  |
| Thick Rim - average duration, Cycles (hours) before leakage | 314 (31) | 16 (1.6) | Not tested | 4220+ (422+) |
| Thin Rim - Cycles | 193 (19) | 29 (3) | Not tested | 4220+ (422+) |
| Medium Speed Endurance Test |  |  |  |  |
| Thick Rim - average duration, Cycles (hours) | 488 (49) | 9 (1) | 1435 (144) | 379 (38) |
| Thin Rim - Cycles (hours) | 29 (3) | 5 (0.5) | 282 (28) | 97 (10) |
| Hot High-Speed Test |  |  |  |  |
| Thick Rim - average hours till leakage (% that Pass) | 9 (12%) | Not tested | 12.5 (75%) | Not tested |
| Thin Rim - average hours till leakage (% that Pass) | 5 (0%) | Not tested | 11 (25%) | Not tested |
| High-Temperature High-Speed Endurance Test |  |  |  |  |
| Thick Rim - hours till leakage (% that Pass) | Not tested | 100% pass | 56 (67%)[2] | Not tested |
| Thin Rim - average hours till leakage (% that Pass) | Not tested | 100% pass | 100% pass | Not tested |

[1]Adhesion depends on cure time and composition. Shown is a typical range for a series of cure times and/or compositions.
[2]One out of three valves tested failed at 56 hours.

Thus, the rubber compositions disclosed herein provide an excellent balance of properties for use in snap-in tire valve applications, including excellent heat resistance, adhesion to brass, retention of air, and physical endurance at high wheel rotational speeds. It is also believed that the compositions and resilient member designs disclosed herein would be useful for other types of valves requiring excellent suitably be practiced in the absence of any element that is not specifically disclosed herein.

What is claimed is:
1. A snap-in tire valve for mounting in a valve hole in a wheel rim, comprising:
 a valve body; and a resilient member having an overall shape including a groove and a rib adapted to snap into and be retained in said hole;

wherein said resilient member comprises:
a first rubber member surrounding and bonded to a first portion of said valve body; and
a second rubber member surrounding and bonded to at least a portion of said first rubber member.

2. The snap-in tire valve of claim 1 wherein said first and second rubber members are of different compositions from each other.

3. The snap-in tire valve of claim 1 wherein said rubber members define two layers between said valve body and said groove, with the thickness of the layer of the first rubber member greater than the thickness of the layer of the second rubber member.

4. The snap-in tire valve of claim 1 wherein one of said first and second rubber members is ethylene-propylene-based elastomer comprising zinc diacrylate or zinc dimethacrylate, and the other of said first and second rubber members is free of zinc diacrylate and zinc dimethacrylate.

5. The snap-in tire valve of claim 4 wherein said second rubber member extends onto and is bonded to a second portion of said valve body.

6. The snap-in valve of claim 5 wherein said second rubber member completely surrounds said first rubber member.

7. The snap-in tire valve of claim 1 wherein at least one of said first and second rubber members comprises the reaction product of: ethylene-propylene copolymer elastomer, a peroxide curative, zinc diacrylate or zinc dimethacrylate, and barium sulfate.

8. The snap-in tire valve of claim 7 wherein said zinc diacrylate or zinc dimethacrylate is present in the range of 3 to 20 parts weight per hundred parts of elastomer.

9. The snap-in tire valve of claim 7 wherein said barium sulfate is present in the range of 10 to 30 parts weight per hundred parts of elastomer.

10. A snap-in tire valve comprising a valve body and a resilient sealing member;
wherein the resilient sealing member comprises a first rubber member comprising the reaction product of at least: an ethylene-alpha-olefin elastomer, a peroxide curative, zinc diacrylate or zinc dimethacrylate, and a high-density inert filler; and
wherein the resilient sealing member further comprises a second rubber member which is free of zinc diacrylate and zinc dimethacrylate.

11. The snap-in tire valve of claim 10 wherein said first rubber member encircles said valve body and is bonded to a portion of said valve body, and
said second rubber member substantially covers said first rubber member.

12. The snap-in tire valve of claim 11 further comprising a groove for engaging the tire valve in a valve opening in a wheel rim,
wherein the portion of the resilient sealing member residing between the groove and the valve body comprises a layer of each said rubber member, each said layer having a thickness, and said layer of said first rubber member being thicker than said layer of said second rubber member.

13. The snap-in tire valve of claim 12 wherein said layer of said second rubber member is less than 10% the total thickness of said layers.

14. A method comprising:
i) applying a first rubber composition to surround a first portion of a tire valve body and vulcanizing said first rubber composition to bond to said first portion;
ii) over-molding a second rubber composition to surround and bond to at least a portion of said vulcanized first rubber composition;
iii) vulcanizing said over-molded second rubber composition to produce a resilient rubber seal member having an overall shape including a groove and a rib and adapted to snap said over-molded tire valve body into and be retained in a valve hole in a wheel rim, wherein said first and second rubber compositions form two rubber layers residing between the groove and the valve body.

15. The method of claim 14 wherein said second rubber composition substantially covers said first rubber composition.

16. The method of claim 14 wherein said first rubber composition comprises an ethylene-alpha-olefin elastomer, a peroxide curative, zinc diacrylate or zinc dimethacrylate, and a high-density inert filler.

17. The method of claim 15 wherein said second rubber composition is free of zinc diacrylate and zinc dimethacrylate.

18. The method of claim 16 wherein said high-density inert filler is barium sulfate and is present in the range of 10 to 30 parts weight per hundred parts of elastomer.

* * * * *